US012461894B2

(12) United States Patent
Vedovati et al.

(10) Patent No.: US 12,461,894 B2
(45) Date of Patent: Nov. 4, 2025

(54) NAMESPACE MAPPING TO SUPPORT FILE HASH GENERATION

(71) Applicant: CrowdStrike, Inc., Sunnyvale, CA (US)

(72) Inventors: Marco Vedovati, Albino (IT); Martin Kelly, Bothell, WA (US)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

(21) Appl. No.: 18/175,770

(22) Filed: Feb. 28, 2023

(65) Prior Publication Data
US 2024/0289303 A1 Aug. 29, 2024

(51) Int. Cl.
G06F 16/00 (2019.01)
G06F 16/13 (2019.01)
G06F 16/16 (2019.01)
G06F 16/17 (2019.01)

(52) U.S. Cl.
CPC .......... G06F 16/164 (2019.01); G06F 16/137 (2019.01); G06F 16/1734 (2019.01)

(58) Field of Classification Search
None
See application file for complete search history.

(56) References Cited

U.S. PATENT DOCUMENTS

| | | | | |
|---|---|---|---|---|
| 8,612,404 B2 * | 12/2013 | Bone | ................... | G06F 16/1734 707/637 |
| 9,805,054 B2 * | 10/2017 | Davis | ................... | G06F 16/182 |
| 9,811,662 B2 * | 11/2017 | Sharpe | ................... | G06F 16/183 |
| 10,296,494 B2 * | 5/2019 | Davis | ................... | G06F 16/182 |
| 10,735,369 B2 * | 8/2020 | Chalakov | ............. | G06F 16/137 |
| 11,297,031 B2 * | 4/2022 | Chalakov | ............. | G06F 16/185 |
| 2007/0055703 A1 * | 3/2007 | Zimran | ................. | H04L 61/301 |
| 2010/0088317 A1 * | 4/2010 | Bone | ..................... | G06F 16/134 709/219 |
| 2014/0006465 A1 * | 1/2014 | Davis | ................... | G06F 16/1752 707/827 |
| 2014/0007239 A1 * | 1/2014 | Sharpe | ................. | G06F 16/183 726/24 |
| 2018/0025025 A1 * | 1/2018 | Davis | ................... | G06F 16/182 709/219 |
| 2019/0370360 A1 * | 12/2019 | Mainali | ................ | G06F 16/188 |
| 2020/0336455 A1 * | 10/2020 | Chalakov | ............. | G06F 16/137 |
| 2020/0364375 A1 * | 11/2020 | Bottomley | ............. | G06F 21/74 |
| 2020/0366571 A1 * | 11/2020 | Vittal | ................. | H04L 41/5032 |

(Continued)

Primary Examiner — Farhan M Syed
(74) Attorney, Agent, or Firm — Womble Bond Dickinson (US) LLP

(57) ABSTRACT

A method of generating a file hash using mount namespace data includes identifying, by a user space monitoring application executing in a user space of an operating system, a target application file associated with a target application process executing in the user space of the operating system, wherein the target application process is associated with a first mount namespace, accessing, by the user space monitoring application, a mapping between the first mount namespace and one or more processes executing in the user space of the operating system, switching, by a processing device, the user space monitoring application to the first mount namespace based on the mapping, and accessing, by the user space monitoring application, the target application file in the first mount namespace.

14 Claims, 7 Drawing Sheets

(56) References Cited

U.S. PATENT DOCUMENTS

2021/0133143 A1* 5/2021 Bono ............... G06F 16/16
2023/0185766 A1* 6/2023 Jones ............. G06F 16/164
                                                                     707/769

* cited by examiner

500 

acquiring, using one or more programs executing in a kernel space of an operating system, fingerprinting data associated with a target application process in a user space of the operating system responsive to detecting an execution of the target application process
502 sharing, by a processing device using the one or more programs, the fingerprinting data with a user space monitoring application executing in the user space of the operating system
504 generating a hash value of a target application file associated with the target application process
506 determining, using the user space monitoring application, a validity of the hash value based on the fingerprinting data
508

identifying, by a user space monitoring application executing in a user space of an operating system, a target application file associated with a target application process executing in the user space of the operating system, wherein the target application process is associated with a first mount namespace
602 accessing, by the user space monitoring application, a mapping between the first mount namespace and one or more processes executing in the user space of the operating system
604 switching, by a processing device, the user space monitoring application to the first mount namespace based on the mapping
606 accessing, by the user space monitoring application, the target application file in the first mount namespace to generate a file hash of the target application file
608

FIG. 6

NAMESPACE MAPPING TO SUPPORT FILE HASH GENERATION

TECHNICAL FIELD

The present disclosure relates generally to cloud computing environments, and more particularly, to systems and methods of fingerprinting files and providing access to the files across mount namespaces to support file hash generation that resolves one or more time-of-check-to-time-of-use (TOCTTOU) race conditions.

BACKGROUND

Malware is a term that refers to malicious software. Malware includes software that is designed with malicious intent to cause intentional harm and/or bypass security measures. Malware is used, for example, by cyber attackers to disrupt computer operations, to access and to steal sensitive information stored on the computer or provided to the computer by a user, or to perform other actions that are harmful to the computer and/or to the user of the computer. Malware may be formatted as executable files (e.g., COM or EXE files), dynamic link libraries (DLLs), scripts, steganographic encodings within media files such as images, and/or other types of computer programs, or combinations thereof. Malware authors or distributors frequently disguise or obfuscate malware in attempts to evade detection by malware-detection or -removal tools.

In recent years, cybercriminals have become increasingly sophisticated in their use of malware and other techniques to alter critical system files, folders, registries, and data end endpoints to carry out advanced cyberattacks. Left undetected, these hackers can steal data, intellectual property, and customer information or otherwise disrupt business operations.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 5 is a flow diagram depicting a method of generating a file hash using fingerprinting data, according to some embodiments of the present disclosure;

FIG. 6 is a flow diagram depicting a method of generating a file hash using mount namespace data, according to some embodiments of the present disclosure.

DETAILED DESCRIPTION

Figure 1:
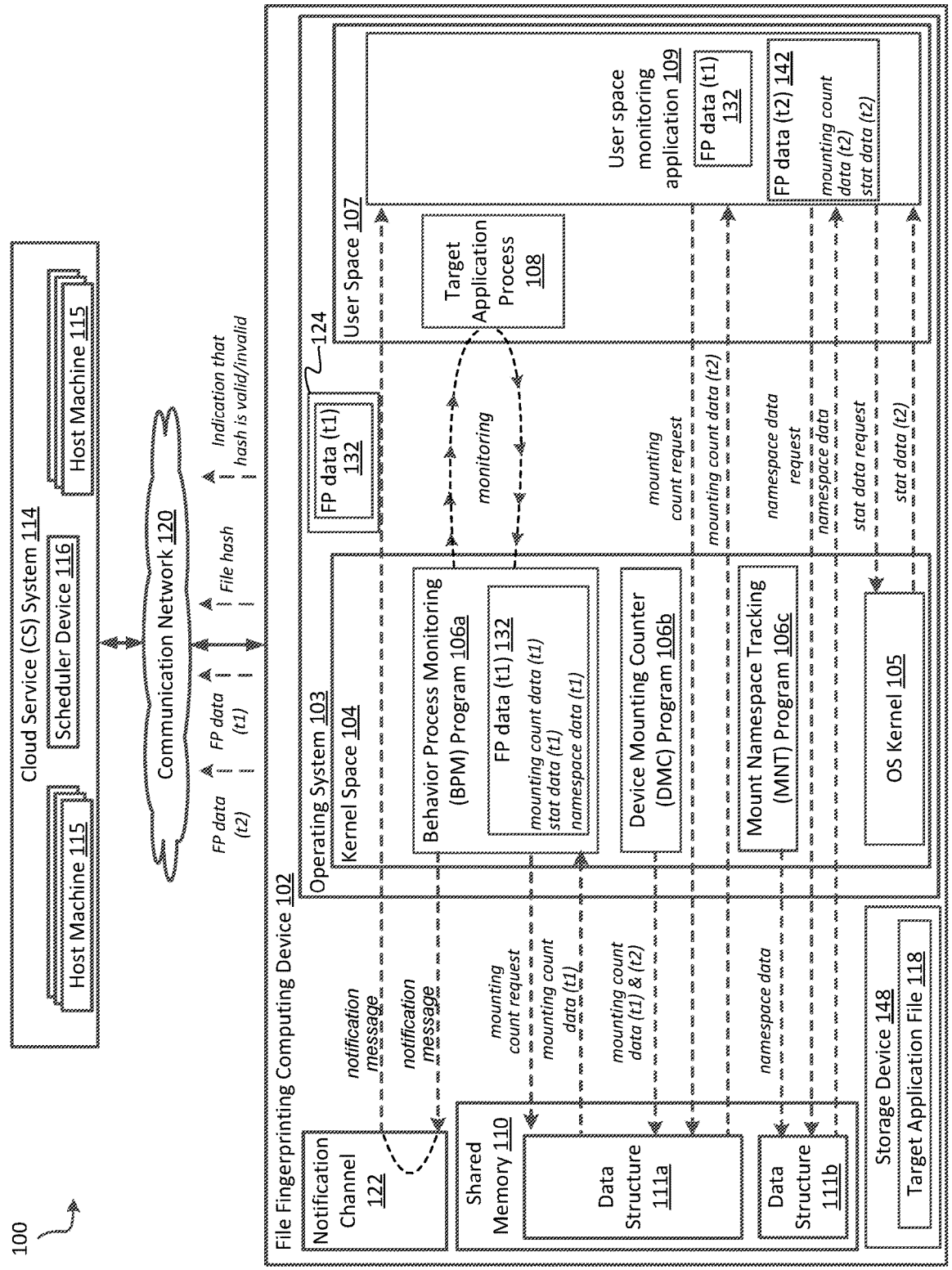
FIG. 1 is a block diagram depicting an example system for fingerprinting files and providing access to the files across mount namespaces to support file hash generation, according to some embodiments of the present disclosure.

As noted, malware is an increasingly challenging problem in computing infrastructures. A number of detection methods have been developed to attempt to address malware, including static scanning of files and monitoring of running applications. One mechanism to address malware from an executing application is to scan the application prior to its execution. The scan can be configured, for example, to identify certain patterns in the instructions of the application or other aspects of the application file format. As a non-limiting example, a scan may compare the structure and/or instructions of an application to known malware to attempt to identify whether the application in question is also potentially contaminated.

Scanning files, however, may be subject to a time-of-check-to-time-of-use (TOCTTOU) race condition. As an example, a particular application may be scanned prior to execution to determine if it contains malware, and the scan may indicate that the application is free of malware. However, between the scan and the execution, the contents of the file may be replaced (e.g., by swapping and/or editing the application file) so that, when the application is finally executed, the application contains malware. Making such a swap/edit of the application may take a fraction of a second, so any delay in executing the application may be vulnerable to such a swap.

Many modern operating systems are separated into a user space and a kernel space. The kernel space is typically more privileged, and may execute operations with an administrative privilege level that is protected from general access. An alternative approach to address the TOCTTOU race condition could directly integrate the scanning into the executing logic of the kernel of the operating system. For example, the kernel could scan and lock the file prior to execution so that the file cannot be modified between the scan and the execution. However, such a process may integrate the malware identification into the kernel logic. Malware identification may require a number of updates and/or modification due to the constant variations in malware that are available. Incorporating malware detection directly into the kernel may expose the kernel to multiple updates to accommodate such variations. Because the operating system kernel often executes at a higher administrative privilege, developers and/or system administrators are reluctant to modify the kernel frequently, as each update may impact the uptime of the system and/or bring in changes that may otherwise alter the operation of the operating system.

In some scenarios, it may be beneficial to allow for execution of privileged operations through a more dynamic and/or secure interface than kernel modifications. One such mechanism is the extended Berkeley packet filter (eBPF). Infrastructure such as eBPF allows one or more programs executing in user space to provide operational logic in the form of, for example, a monitoring program to be executed within the kernel space of the operating system. Such access, however, may be limited in functionality to increase security. For example, environments such as eBPF may limit the types of access and/or instructions that may be executed within the kernel space, which may limit the types of operations that may be performed in such environments. In some embodiments, a monitoring program executing in the kernel in infrastructure similar to eBPF may be favorably positioned to execute analysis of executing applications, but may be restricted in the types of operations that the monitoring program can pursue to assist in determining file integrity.

For example, scanning a file to determine if it contains malware may include the generation of a file hash. Hash-based verification may attempt to verify that a file has not been modified by comparing its current hash value to a prior value. A file hash may be an output of a hashing algorithm, such as MD5 (message digest 5) or SHA (secure hash algorithm), that generates a string as a hash value. This hash value may be used to represent the contents of the file, which can be used for comparison and/or integrity purposes. However, generation of the hash value may involve operations that may not be allowed in certain contexts. For example, the generation of a hash value may require a monitoring program to sleep (e.g., defer execution for some amount of time until a particular condition is met) as part of the generation of the hash, which may not be allowed in infrastructures such as eBPF. Thus, a monitoring program executing within the kernel utilizing an infrastructure similar to eBPF may be able to execute inline while the kernel is loading an application file into memory to be executed as an operating system process. However, such a monitoring program may not be able to execute the full range of operations that may be desired to monitor the application file. As used herein, executing inline refers to the ability for the kernel to execute instructions and/or logic within the same stack of the system call used to create a process associated with the execution of a particular application file.

In some embodiments, a monitor may separate its functionality to address these limitations. For example, a monitoring program may include a portion executing within the kernel space of the operating system and a portion executing in the user space of the operating system. In some embodiments, the calculation of a file hash of a given application may be deferred to the portion of the monitoring program executing in the user space of the operating system, where the full functionality of the user space operations may be utilized. However, this deferred hashing exposes the monitoring program (e.g., an eBPF-based monitoring program) to the TOCTTOU race condition with respect to the file hashing. That is, if the content of the target application file changes between the time the target application is executed in the kernel space and the time the user-space portion of the monitoring program hashes the application file, then the hashes do not correspond to what was actually executed. As a result, the ability to accurately perform the generation of a file hash in a way that may be utilized with confidence in a file integrity verification of the target file may be degraded.

Furthermore, the limitations of mount namespaces can also interfere with the monitoring program (e.g., an eBPF-based monitoring program) and further degrade reliability of the circumstances associated with the generation of a file hash. Namespaces may be used by some execution environments, such as containers, to assist in isolation between different environments (e.g., other containers). One type of namespace includes a mount namespace, which allows processes (e.g., applications) running in distinct mount namespace instances to see distinct and isolated filesystem hierarchies. Mount namespace isolation may also restrict the ability of a user space resident portion of a monitoring application to see certain application files. For example, a portion of a monitoring program executing in user space may be executing in a context that does not have direct access to files in other mount namespaces for hashing.

In some cases, an operating system (OS), such as a LINUX OS, may provide a mechanism to access a file F in mount namespace M. For example, the OS may provide an application programming interface (API), such as a setns( ) system call, where a filesystem view of a different process P may be obtained. However, such an API may include restrictions on how that call may be utilized. For example, the API may require that the process P is still running. In addition, the API may provide a current view of the mount namespace at a given time, and may not be able to provide access to prior-utilized mount namespaces (e.g., if the process P has since changed mount namespaces). These limitations of the OS API may make it an unreliable solution if process P is a short-lived process, or a process that has changed its mount namespace. For example, a portion of a monitoring program that is executing in user space may attempt to utilize the API to access the mount namespace of a given target application file to generate a file hash, but may be restricted if the process associated with the application file has already exited. Moreover, such a monitoring process may also be susceptible to an occurrence of a TOCTTOU race condition if the process has since changed its mount namespace. For example, if a process has changed namespaces since initially being executed, accessing its mount namespace utilizing the OS-provided API may result in a view of a different filesystem and/or file.

Consequently, the operating system, its hardware, and the networks connected to the hardware are often exposed to higher risk of attacks. This allows the attacker to steal application data and/or excessively consume the computing resources (e.g., memory resources, power resources, processing resources, networking resources) of an endpoint device, the communication network, and/or a cloud service system. Thus, there is a long-felt but unsolved need to solve the problems of providing an accurate mechanism for generating file hashes amid these restrictions so as to improve the quality of file integrity verification.

Aspects of the present disclosure address the above-noted and other deficiencies by generating a file hash of a user space file to resolve and/or reduce a TOCTTOU race condition. In some embodiments, the file hash may be utilized for fingerprinting the file, such as for file integrity verification. Benefits of the embodiments of the present disclosure may include a protection against application data theft or protection against wastage of computing resources (e.g., memory resources, power resources, processing resources, networking resources) of the cloud service system occurring because of potential compromises otherwise. Embodiments of the present disclosure may provide an improvement to the operation of a computer by providing a secure capability for generating a hash of a file without requiring modifications to the kernel of the operating system. Thus, embodiments of the present disclosure may allow for the operations of the computer to be secured while allowing the protection to be flexible and capable of being updated without requiring an update to the kernel, including its potential associated system downtime.

As discussed in greater detail herein, the embodiments of the present disclosure implement a two-stage file hashing solution involving both a kernel resident portion (e.g., utilizing eBPF) of a monitoring program and a user space resident portion of the monitoring program. The monitoring program may collect a set of fingerprinting data that uniquely identifies the content of a file (e.g., a file containing computer instructions associated with an executable application). The fingerprinting data may be generated inline at execution time of the application file. The user space portion of the monitoring program may compute a file hash after execution of the application and store it (e.g., in a cache and/or shared memory). The user space portion of the monitoring program may unambiguously determine if the file hash that was generated corresponds to the file content at the time the kernel space portion of the monitoring program (e.g., an eBPF program) fingerprinted it. The embodiments of the present disclosure may also be extended to use cases other than the hashing of executables, for example, to check if the content of a file is unchanged.

Aspects of the present disclosure also address the above-noted and other deficiencies by configuring the monitoring program to track mount namespaces between processes. For example, each mount namespace may be identified with a unique identifier (ID) and the processes that run in them may be tracked. To access files in other mount namespaces, the user space portion of the monitoring program may temporarily associate with those namespaces (e.g., using an API such as setns( ) or other similar interface), obtaining a view of the filesystem that gives access to a file from which a process executed. By tracking the mount namespace that a process had when the process was first executed, the monitoring program may be able to shift to that mount namespace to view a file from which the process was loaded, even if the process has exited or has since changed namespaces. Stated another way, the monitoring program may utilize the current mount namespace of a first process to access a previous mount namespace of another process that may have since exited and/or changed its mount namespace. The embodiments of the present disclosure may keep track of which processes run in what mount namespace, and may utilize those processes as a mechanism to access mount namespaces for other processes that have since changed. Embodiments of the present disclosure may address and/or reduce disadvantages associated with the limitations that are caused by short-lived processes. The embodiments also reduce and/or avoid TOCTTOU race conditions by utilizing inline execution monitoring using a kernel resident portion of a monitoring program (e.g., utilizing an eBPF infrastructure) to track mount namespace information.

In an illustrative embodiment, one or more programs (e.g., eBPF) executing in the kernel space of an operating system monitor a target application that is executing in the user space of the operating system to detect a real-time behavior of the target application. The one or more programs synchronously execute inline with a kernel of the operating system. The one or more programs acquire a set of fingerprinting data associated with the target application responsive to detecting the execution of the target application. The one or more programs share the set of fingerprinting data with a user space monitoring application executing in the user space of the operating system via a shared memory. The user space monitoring application validates a hash value of the target application based on the set of fingerprinting data.

In another illustrative embodiment, one or more programs executing in a kernel space of an operating system monitor a first mount namespace to identify one or more processes of the first mount namespace. Each of the one or more processes has access to a target application executing in a user space of the operating system via one or more filesystem views of the first mount namespace. The one or more programs share process metadata associated with the one or more processes of the first mount namespace with a user application executing in the user space of the operating system via a shared memory. The user application uses the process metadata to switch (e.g., transition, toggle) from a second filesystem view of a second namespace to a first filesystem view of the first mount namespace to access the target application.

FIG. 1 is a block diagram depicting an example system 100 for fingerprinting and providing access to a user space file across mount namespace instances to support file hash generation, according to some embodiments of the present disclosure. The system 100 may include a cloud service system 114 and a file fingerprinting computing device 102 that are communicably coupled together via a communication network 120.

The file fingerprinting computing device 102 may include a processing device, and may execute an operating system (OS) 103 on its processing device. The OS 103 may include, for example, Microsoft Windows, Apple macOS, or Linux. The operating system 103 segregates its resources (e.g., memory, virtual memory, storage, etc.) of the file fingerprinting computing device 102 into a kernel space 104 and a user space 107. The user space 107 executes a target application process 108, which can be any type of application including, for example, an internet browser application, an email application, a gaming application, a spreadsheet application, a word processing application, an accounting application, and the like.

The target application process 108 executing in the user space 107 may be a series of computer instructions loaded into a memory of the file fingerprinting computing device 102 and executed by the processing device of the file fingerprinting computing device 102. In some embodiments, the computer instructions of the target application process 108 executing in the user space 107 are loaded from a target application file 118 accessible by the file fingerprinting computing device 102. For example, the target application file 118 may be stored in a storage device 148 of the file fingerprinting computing device 102 or otherwise communicatively coupled to the file fingerprinting computing device 102.

The user space 107 also executes a user space monitoring application 109 that is configured to monitor and/or fingerprint the target application process 108 and/or the target application file 118. For example, the user space monitoring application 109 may generate and/or validate a hash value of the target application file 118 based on a set of fingerprinting data associated with the target application file 118. By doing so, the user space monitoring application 109 can resolve a potential TOCTTOU race condition that can occur between the "check" time when the target application process 108 executes and the "use" time when the user application 109 calculates a hash of the target application file 118 from which the target application process 108 is loaded. The user space monitoring application 109 may be any type of application including, for example, an anti-virus and/or anti-malware software application, though embodiments of the present disclosure are not limited to such applications.

The applications (e.g., target application process 108, user space monitoring application 109) that execute in the user space 107 do not have the same privileges as the processes that execute in the kernel space 104. In some cases, the user space applications may access administrative functions provided by the kernel space 104 via a system call interface that is exposed by an OS kernel 105.

The kernel space 104 may include a privileged operating system kernel 105 (shown in FIG. 1 as OS kernel 105), kernel extensions, and device drivers. As shown in FIG. 1, the kernel space 104 executes the OS kernel 105 which has administrative control over the file fingerprinting computing device 102. For example, the OS kernel 105 may manage the process and memory management, disk storage, and low-level network of the file fingerprinting computing device 102.

In some embodiments, the kernel space 104 may also execute additional programs that support the user space monitoring application 109. For example, the operating system 103 may support an interface which allows certain applications to be loaded into the kernel space 104 to execute with additional administrative privileges. Because these applications may have access that exceeds that of typical applications executing in user space 107, some functions of these applications may be limited. In some embodiments, these applications executing in kernel space 104 may be executing in an eBPF infrastructure.

In some embodiments, a behavioral process monitoring (BPM) program 106a may execute within the kernel space 104. As will be described further herein, the BPM program 106a may monitor the real-time behavior of the target application process 108 and may share fingerprinting (FP) data 132 associated with the target application process 108 with the user space monitoring application 109.

A behavior (sometimes referred to as, real-time behavior) of an application may be an initial execution of the application, one or more calls (or attempts to call) from the application or function, for example, a process control call (e.g., create process, terminate process, load/execute, get/set process attributes, wait for time, wait event, signal event, allocate memory, and free memory), a file management call (e.g., create file, delete file, open/close file, read/write file, reposition/move file, get/set file attributes), a device management call (e.g., request device, release device, read, write, reposition, get/set device attributes, logically attach or detach devices), an information management call (e.g., get/set total system information, get/set process, file, or device metadata), a communication call (e.g., create/delete communication connection, send/receive messages, transfer status information, attach or detach remote devices), and/or a protection call (e.g., get/set file permission).

The kernel space 104 may also execute a device mounting counter (DMC) program 106b for counting a number of times the operating system 103 mounts (or unmounts, in some embodiments) a storage device 148 (e.g., hard drive, universal serial bus (USB), network storage, RAID system, etc.) to make the files (e.g., target application file 118) on the storage device 148 available for access. In order to make the storage of the storage device 148 available to the operating system 103, the storage device 148 may be mounted to the operating system 103. Mounting a storage device 148 may provide a connection between access mechanisms of the operating system 103 and the underlying hardware storage of the storage device 148. For example, in some embodiments, mounting the storage device 148 may provide a filesystem on the storage device 148, including data associated with files (such as target application file 118) that are stored on the storage device 148. Mounting the storage device 148 to the operating system 103, including a filesystem, may provide hierarchical storage structure (such as directories) which may be traversed and accessed in a way that hides the underlying details of the storage device 148. The use of the mounting and/or filesystem for the storage device 148 may allow for detailed tracking of metadata associated with files of the storage device 148, including path information, indexing structures (sometimes referred to as index nodes or "inodes") to track storage of blocks of the files, file permissions, file access times, file create times, and the like.

An inode, short for index node, is a data structure used by the filesystem to store information about a file or directory in an operating system (e.g., UNIX or Linux). Each file or directory on the filesystem may be represented by an inode, which contains metadata about the file or directory, such as its owner, permissions, timestamps, and pointers to the disk blocks that store the file's contents. Inodes may be used by filesystems to facilitate access and management of files and directories. When a file or directory is created, the filesystem allocates a new inode for it, and assigns it a unique identification number. This identification number is used by the filesystem to locate the inode and the associated file or directory on the storage device.

In some embodiments, the DMC program 106b may track the number of times a particular storage device 148 has been mounted. For example, in some implementations of an operating system 103, devices such as storage device 148 may be identified by a device ID. However, in some cases, a device ID may be reused for a different physical device. For example, a first device (e.g., storage device 148) may be mounted to the operation system 103 and receive a device ID. Subsequently, the first device may be unmounted and the same device ID may be utilized to mount a second device. This can be problematic for generating a file hash because, in a TOCTTOU scenario in which a file from a certain device ID is checked after it is executed, the underlying device on which a file is stored may be changed, even though the device ID appears to be the same.

In some embodiments, the DMC program 106b may be configured to maintain a mapping between each device ID of the file fingerprinting computing device 102 and a count of how many times the device ID has been mounted and/or unmounted. For example, each time a device ID is remapped to a different physical device (e.g., from a first device to a second device), a counter associated with the device ID may be incremented. This may allow for a way to establish if the device ID has been assigned to another storage device between a first time t1 and a second time t2. For example, if a file is associated with a device ID having a particular mount count at the first time t1, the count associated with the device ID may be checked at the second time t2 to see if the count has changed. If the count has changed, it can be suspected that an underlying device has changed, which may inform the file hashing process for a hash of a file associated with the device ID, since it cannot be guaranteed that the file on the device at time t2 is the same one that was present on the device at time t1.

In some embodiments, the DMC program 106b running in kernel space 104 may maintain its mounting count data in a shared data structure 111a of shared memory 110. The shared data structure 111a may be shared with the user-space monitoring application 109 executing in the user space 107. Stated another way, the mounting count data may be shared in a shared data structure 111a of shared memory 110 in such a way that it may be accessed by both the user-space monitoring application 109 executing in the user space 107 and the DMC program 106b running in kernel space 104.

The kernel space 104 may also execute a mount namespace tracking (MNT) program 106c for tracking the one or more processes associated with a mount namespace. As described herein, some processes, such as target application process 108, may execute in namespaces provided by the operating system 103. The namespaces may increase isolation between the processes, and may include mount namespaces. In some embodiments, a location of a file (e.g., target application file 118) as seen by a particular target application process 108 may be specific to the particular mount namespace of the target application process 108. In order to access the target application file 118 from user space 107, the user space monitoring application 109 may switch to the same mount namespace as the target application process 108. In some embodiments, the user space monitoring application 109 may identify the mount namespace to be utilized through a namespace-to-process mapping maintained by the MNT program 106c.

For example, when new mount namespaces are created and/or a process is assigned to a mount namespace, the MNT program 106c may update its mapping to associate a process identifier (PID) with the mount namespace being utilized by the PID. In some embodiments, the MNT program 106c may maintain a unique ID for each mount namespace, and may maintain a mount namespace ID-to-PID listing, where a list of PIDs is maintained for each mount namespace being used. Thus, by accessing the mapping utilizing a mount namespace ID, a list of PIDs utilizing that namespace may be determined.

In some embodiments, the MNT program 106c running in kernel space 104 may maintain its mount namespace mapping in a shared data structure 111b of shared memory 110. The shared data structure 111b may be shared with the user-space monitoring application 109 executing in the user space 107. Stated another way, the mount namespace mapping may be shared in a shared data structure 111b of shared memory 110 in such a way that it may be accessed by both the user-space monitoring application 109 executing in the user space 107 and the MNT program 106c running in kernel space 104.

In some embodiments, any of the programs (e.g., BPM program 106a, DMC program 106b, and MNT program 106c) may be combined into a single program that includes the same features and functionality as the individual programs. In some embodiments, any of the programs 106 may be based on an Extended Berkeley Packet Filter (eBPF) infrastructure.

The kernel space 104 limits the tasks a program executing in an infrastructure similar to eBPF can execute, which may limit the ability any of the applications (e.g., BPM program 106a, DMC program 106b, and MNT program 106c) that are executing in the kernel space 104 from being able to calculate a hash value of a file (e.g., the target application file 118).

The file fingerprinting computing device 102 includes the shared memory 110 that is communicatively coupled to the operating system 103. The shared memory 110 may include one or more data structures (e.g., linear, tree, hash, graphs, array, linked list) for storing sets of data (e.g., fingerprinting data). As shown in FIG. 1, the shared memory 110 includes the data structure 111a for storing the data that is generated by the DMC program 106b including, for example, mounting count data that indicates the number of times a particular device ID is mounted. The shared memory 110 includes the data structure 111b for storing the data that is generated by the MNT program 106c including, for example, namespace data that is associated with one or more mount namespaces utilized by processes of the operating system 103 (e.g., target application process 108). In some embodiments, the shared memory 110 may be a hash map.

Still referring to FIG. 1, as part of executing the target application process 108, the OS kernel 105 may receive a request to execute the target application process 108 in the user space 107 of the operating system 103 from the target application file 118. In response, the OS kernel 105 may load the target application process 108 in the memory of the file fingerprinting computing device 102 for execution. The OS kernel 105 also executes the BPM program 106a in the kernel space 104 of the operating system 103 to monitor the real-time behavior of the target application process 108. The BPM program 106a may be configured to synchronously execute inline with the OS kernel 105 of the operating system 103. An inline function, for example, may refer to an eBPF program that executes inline within the OS kernel 105 (e.g., a Linux kernel) during the creation of the target application process 108. In some embodiments, the BPM program 106a may be an eBPF program that is attached to one or more probe points inside the OS kernel 105. The BPM program 106a may be configured to be called by the OS kernel 105 in response to certain actions.

For example, the BPM program 106a may be called when one or more operations associated with the target application process 108 are performed. When the BPM program 106a detects the one or more real-time behaviors (e.g., calls, reads, write, etc.) of the target application process 108, it generates behavioral detection (BD) data that is indicative of the real-time behavior. For example, the BPM program 106a may detect when the target application process 108 is first launched (e.g., by an execve( ) system call). Upon detecting that the target application process 108 has been launched, the BPM program 106a may generate FP data (t1) 132. As used herein, FP data (t1) refers to fingerprinting data taken at time t1. The FP data (t1) 132 includes file status data (referred to herein as stat data) from the OS kernel 105, mounting count data from the DMC program 106b, and/or namespace data taken from the MNT program 106c.

The stat data may include stat data taken at time t1 (e.g., stat data (t1)). The stat data may include data detected by the BPM program 106a and/or retrieved from the OS kernel 105. In some embodiments, the stat data (t1) may include information associated with the target application process 108 and/or the target application file 118 from which the target application process 108 is loaded. The stat data may include, for example, a file inode number of the target application file 118, a file change time (e.g., ctime) of the target application file 118, and/or a device ID of the device upon which the target application file 118 is located. The stat data may be collected inline with the execution of the launching of the target application process 108, which may be considered t1.

In addition to the collection of the stat data at time t1, the BPM program 106a may also collect mounting count data from the DMC program 106b at time t1. For example, the BPM program 106a may collect a mount count for the device ID associated with the target application file 118. In some embodiments, the mount count may be taken at a same (or substantially the same, e.g., within the same second) time t1 as the collection of the stat data (t1). In some embodiments, the mount count for the device ID associated with the target application file 118 may be collected inline with the execution of the launching of the target application process 108, which may be considered t1. In some embodiments, the BPM program 106a may retrieve the mounting count data (t1) by accessing the shared data structure 111a maintained by the DMC program 106b.

In addition to the collection of the stat data at time t1, the BPM program 106a may also collect mount namespace data from the MNT program 106c at time t1. For example, the BPM program 106a may collect a mount namespace identifier for the target application process 108 that is launched. In some embodiments, the mount namespace identifier (t1)

may be taken at a same (or substantially the same, e.g., within the same second) time t1 as the collection of the stat data. In some embodiments, the mount namespace identifier for the target application process 108 may be collected inline with the execution of the launching of the target application process 108, which may be considered t1. In some embodiments, the BPM program 106*a* may retrieve the mount namespace identifier by accessing the OS kernel 105 during the creation of the target application process 108 and/or by accessing the shared data structure 111*b* maintained by the MNT program 106*c*.

As previously discussed, for file integrity and/or verification purposes, it may be advantageous to generate a file hash of the target application file 118. However, due to its location in the kernel space 104 and the circumstances of its execution (e.g., as an eBPF program) the BPM program 106*a* may not have access to the functionality needed to generate an appropriate file hash at the same time that the launch of the target application process 108 is detected. Embodiments of the present disclosure may allow for the file hash to be generated at a later time t2 that is after the time t1 when the target application process 108 is launched. The FP data (t1) 132 may be utilized to validate the integrity of the generated file hash despite the fact that the file hash is generated at a later time.

The file fingerprinting computing device 102 includes a notification channel 122 (e.g., a ring buffer) to allow the BPM program 106*a* to send notification messages 124 to the user space monitoring application 109. The BPM program 106*a* may send a notification message 124 to the user space monitoring application 109 via the notification channels 122, where the notification message 124 alerts the user space monitoring application 109 that the target application process 108 has been launched. The notification message 124 sent via the notification channel 122 may include FP data (t1) 132 that is associated with the target application process 108. The BPM program 106*a* may generate FP data 132 at a first time t1 (e.g., at 21 h:00 m:12 s) and may include the FP data (t1) 132 in the notification message 124. The FP data (t1) 132 may include stat data (t1) (e.g., file inode number, a file change time, and/or a device identifier) from the OS kernel 1-5, mounting count data (t1) maintained by the DMC program 106*b*, and namespace data (t1) maintained by the MNT program 106*c*.

The user space monitoring application 109 may use the FP data (t1) 132 that is associated with the target application process 108 received over the notification channel 122 to validate a hash value of the target application file 118. Advantageously, this allows the user space monitoring application 109 to resolve a TOCTTOU race condition that can occur between the "check" time when the target application process 108 executes and the "use" time when the user space monitoring application 109 calculates a hash of the target application file 118.

Figure 2:
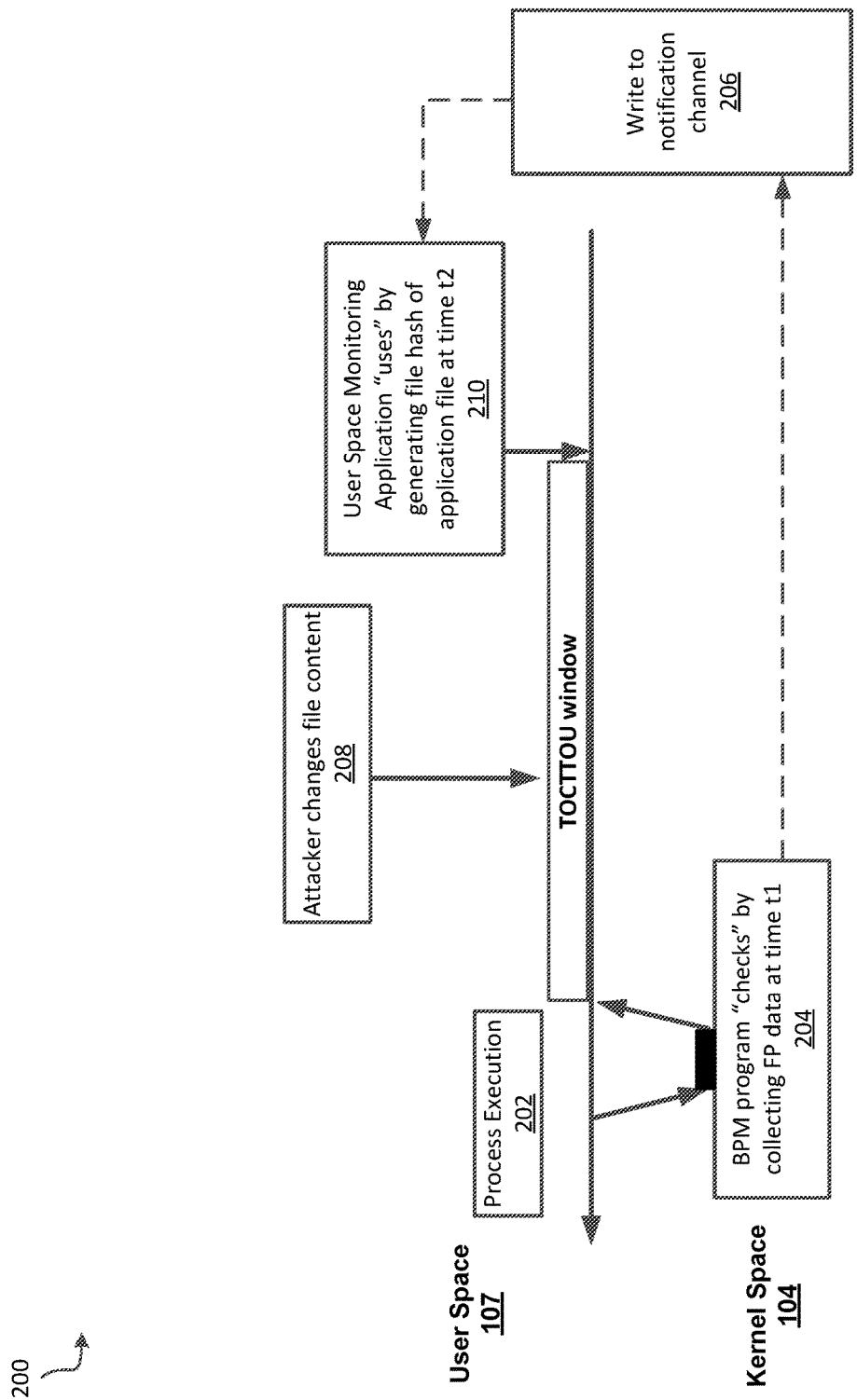
FIG. 2 is a timing diagram depicting a time-of-check-to-time-of-use (TOCTTOU) window that is mitigated during a file hash generation of the target application file in FIG. 1, according to some embodiments of the present disclosure.

For example, FIG. 2 is a timing diagram 200 depicting a time-of-check-to-time-of-use (TOCTTOU) window that is mitigated during a file hash generation of the target application file 118 in FIG. 1, according to some embodiments of the present disclosure. A description of elements of FIG. 2 that have been previously described will be omitted for brevity. The timing diagram 200 shows example operations that could take place in the kernel space 104 and the user space 107 of the operating system 103.

At operation 202, a process (e.g., the target application process 108) begins to execute on a processing device of the file fingerprinting computing device 102. At operation 204, the BPM program 106*a* detects the execution of the target application process 108 and "checks" the target application process 108 by collecting the FP data (t1) 132 of the target application process 108. The FP data 132 may be taken at time t1, substantially concurrent with the execution of the target application process 108. At operation 206 (which occurs in response to operation 204), the BPM program 106*a* writes the FP data 132 to the notification channel 122.

At operation 210, the user space monitoring application 109 receives the notification from the BPM program 106*a* alerting of the creation/execution of the target application process 108. The notification is received at a time t2 that is after t1. At time t2, the user space monitoring application 109 "uses" the notification regarding the execution of the target application process 108 to generate a file hash of the target application file 118 that is associated with the target application process 108.

However, because there is an interval of time between time t1 when the target application process 108 is executed and time t2 when a user space monitoring application 109 learns of the execution and can generate a file hash, an attacker could tamper with the target application file 118 and/or the target application process 108 between operation 204 and operation 210, which is referred to as the TOCTTOU window. If this happens, then the file hash generated at time t2 (e.g., operation 210) may not be an accurate file hash and may not accurately represent the instructions that are executing in target application process 108. While not guaranteed, this altering of the target application file 118 and/or the target application process 108 may be an indicator of malware. Unless the TOCTTOU window is addressed, the user space monitoring application 109 cannot use hash values of the target application file 118 taken at time t2 as a reliable means to confirm that an attacker did or did not tamper with the target application file 118.

However, embodiments of the present disclosure address the TOCTTOU window by collecting FP data 132 at time t1 when the target application process 108 is executed. In some embodiments, the user space monitoring application 109 may validate a hash value of the target application file 118 based on the FP data (t1) 132 received from the BPM program 106*a* regarding the target application process 108. The user space monitoring application 109 may compare the FP data 132 taken at time t1 to similar fingerprinting data taken at time t2 to determine if the contents of the target application file 118 have changed.

In some embodiments, prior to generating the FP data (t2), the user space monitoring application 109 may open the target application file 118 and access its contents. In some embodiments, accessing the contents of the target application file 118 prior to generating the FP data (t2) may avoid a race condition due to concurrent modification of the target application file 118. In some operating systems, opening the target application file 118 may serve to lock the target application file 118 to prevent further modification, which may close an additional opportunity for the target application file 118 to be modified before its file hash is generated. In some embodiments, the target application process 108 may be executing within a namespace, such as a mount namespace. The user space monitoring application 109 may be executing within a mount namespace different than that of the target application process 108, and therefore may not be able to access the namespace of the target application process 108 by default.

Figure 3:
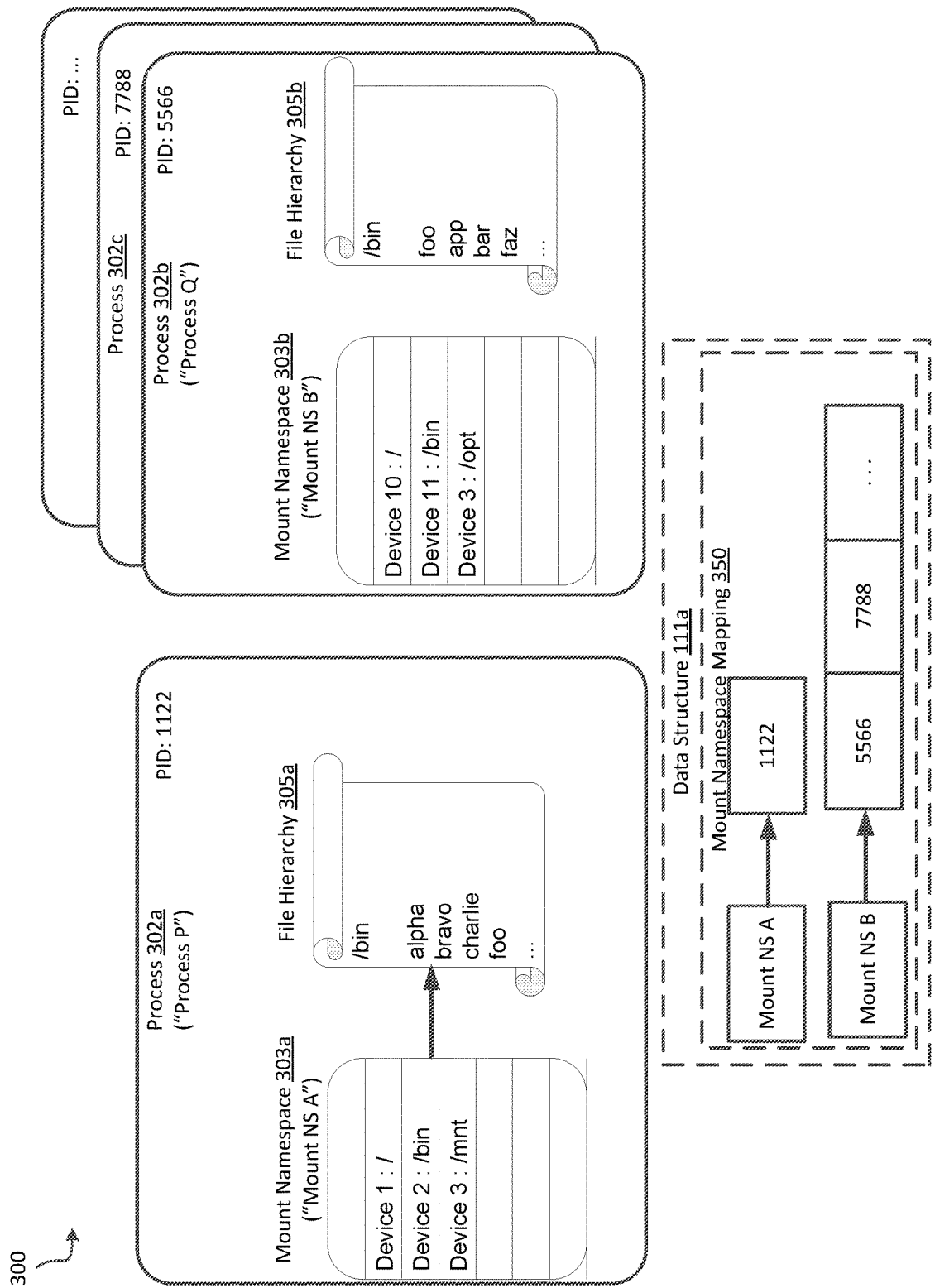
FIG. 3 is a block diagram depicting an example environment of mount namespaces of processes, according to some embodiments of the present disclosure.

FIG. 3 is a block diagram depicting an example environment of mount namespaces of processes, according to some embodiments of the present disclosure. Mount namespaces provide isolation of the list of mounts seen by the processes in each namespace instance. Thus, the processes in each of the mount namespace instances will see distinct single-directory hierarchies.

The environment 300 includes a process 302a (e.g., process "P") and a process 302b (e.g., process "Q"). A process may be an application (e.g., target application process 108 in FIG. 1 and/or user space monitoring application 109 in FIG. 1) or a container that includes one or more applications.

The process 302a is associated with PID 1122. The process 302a runs as part of a mount namespace 303a (shown in FIG. 3 as, mount NS A), which gives the process 302a a first view of a filesystem of the operating system 103. The first view includes a file hierarchy 305a, which includes one or more files and one or more directories of the filesystem of the operating system 103.

The process 302b is associated with PID 5566. The process 302b runs as part of a mount namespace 303b (shown in FIG. 3 as, mount NS B), which gives the process 302b a second view of a filesystem of the operating system 103. The second view includes a file hierarchy 305b, which includes one or more files and one or more directories of the filesystem of the operating system 103.

Each of the processes may have different views of the filesystem of the operating system 103. For example, as shown in FIG. 3, the process 302a has a first view of the filesystem hierarchy 305 that includes file paths: /bin/alpha, /bin/bravo, /bin/charlie, and/bin/foo. Conversely, the process 302b has a second view of the file hierarchy 305b that includes file paths: /bin/foo, /bin/app, /bin/bar, and /bin/faz. As such, process 302b may view/bin/app, but process 302a cannot view/bin/app because it is not included in the file hierarchy 305a associated with the mount namespace 303a. In some embodiments, /bin/app might be included in the filesystem hierarchy 305, but is located in a different subdirectory or has a different filename; thereby making it unviewable to process 302a when trying to access with this wrong file path.

Moreover, as illustrated in FIG. 3, both the first file hierarchy 305a and the second file hierarchy 305b may include a /bin/foo, but it is not guaranteed that they are the same file. Because they are in different file hierarchies, different files can share a same name and/or path. As a result, without a proper mount namespace context, a file path to a file is not guaranteed to access the same file as in another mount namespace.

One or more of the processes may have the same view of the filesystem of the operating system 103 as another process. For example, another process 302c may be associated with PID 7788. The process 302c runs as part of the same mount namespace 303b as process 302b, which gives the process 302c a third view of the filesystem of the operating system 103. The third view includes the file hierarchy 305b, which includes one or more files and one or more directories of the filesystem of the operating system 103 that are the same as those included in the second view of process 302b.

As shown in FIG. 3, a mount namespace mapping 350 may be maintained, e.g., by the MNT program 106c in data structure 111a. The mount namespace mapping 350 may map a given mount namespace ID to the PIDs of the processes that are currently utilizing that mount namespace. For example, given the mount namespace ID of "Mount NS B," it may be seen that PIDs 5566 and 7788, at least, utilize this mount namespace. In FIG. 3, the ID of the mount namespace in the mount namespace mapping 350 is illustrated as a string value, but embodiments of the present disclosure are not limited to such a configuration. In some embodiments, the ID of the mount namespace may be a numeric value.

Processes (and their associated PIDs) may move between namespaces. As processes change mount namespaces, this may be detected by the MNT program 106c. Responsive to detecting that a process has joined or left a mount namespace, the MNT program 106c may alter the mount namespace mapping 350 so that the mount namespace mapping 350 correctly represents the PIDs that are associated with a given mount namespace. Thus, at any given time, the mount namespace mapping 350 (e.g., as part of shared data structure 111a) may be accessed to determine which PIDs are associated with which mount namespaces.

Referring back to FIG. 1, since the user space monitoring application 109 and the target application process 108 may be in separate mount namespaces, the user space monitoring application 109 may need additional operations to be able to be able to open the target application file 118. In some embodiments, the user space monitoring application 109 may use the FP data 132 received from the BPM program 106a to switch to the mount namespace of the target application process 108.

For example, the FP data 132 received from the BPM program 106a may include the mount namespace ID for the target application process 108. The user space monitoring application 109 may obtain a PID associated with the mount namespace ID by accessing the data structure 111b in shared memory 110. For example, the data structure 111b in shared memory may include a mount namespace ID to PID mapping (such as the mount namespace mapping 350 illustrated in FIG. 3), that provides a list of PIDs that share a same mount namespace ID. By accessing the data structure 111b, the user space monitoring application 109 may be able to obtain a list of PIDs that share a same mount namespace as the target application process 108. In some operating systems 103, a given application may change their mount namespace to a mount namespace of another process by providing the PID of that process. The user space monitoring application 109 may transition to the mount namespace associated with the target application process 108 by providing a PID of a processing sharing that same mount namespace. In some embodiments, the PID may be a PID of the target application process 108 (e.g., the user space monitoring application 109 may use the PID of the target process application 108 to access the mount namespace of the target process application 108), but the embodiments of the present disclosure are not limited to such a configuration. For example, in some cases, the target application process 108 may have already exited. In another example, the target application process 108 may have switched mount namespaces since being launched, either through normal operation or in an attempt to hide the origins of the target application process 108. By using the mount namespace to PID mapping in the data structure 111b, the user space monitoring application 109 may still be able to access the original mount namespace (e.g., the mount namespace when the target application process 108 was launched) even if the target application process 108 has exited or has since switched mount namespaces. In some embodiments, the namespace data may be retrieved from the shared memory 110 by sending (e.g., via a bpf( ) system call) a namespace data request to the shared memory 110.

Once a PID associated with the namespace data (t1) of the target application process 108 has been obtained, the user space monitoring application 109 may transition to the mount namespace of the target application process 108.

Once in the mount namespace, the user space monitoring application 109 may open the target application file 118, and calculate a file hash of the target application file 118.

A file hash is a value generated from a set of mathematical operations on a file's contents. A file hash may be used to ensure the integrity of a file by verifying that the contents of the file have not changed since the file hash was created. The hash value acts as a digital fingerprint of the file, and if even a single bit of the file is altered, the hash value will be different, thus allowing detection of the change. In some embodiments, the user space monitoring application 109 may utilize hash algorithms such as MD5, SHA-1, SHA-256, and/or SHA-512, though these are merely examples, and other hash algorithms may be utilized without deviating from the embodiments of the present disclosure. In some embodiments, the file hash algorithms may produce a fixed-length output, which may be represented as a string of characters in hexadecimal format.

After the hash value has been generated, the user space monitoring application 109 may validate that the generated hash value is correct, by validating that the target application file 118 has not been changed since the target application process 108 was executed. The user space monitoring application 109 obtains fingerprinting data (e.g., FP data (t2)) 142 that was generated at time t2, where the FP data (t2) includes stat data (t2) and mounting count data (t2). In some embodiments, the user space monitoring application 109 obtains the stat data (t2) by sending an OS data request (e.g., fstat ( ) system call) to the OS kernel 105 for stat data associated with the target application file 118, which in turn, causes the OS kernel 105 to generate stat data (t2) at time t2 for the target application file 118 that is associated with the target application process 108. The stat data (t2) may include information indicative of at least one of a file inode number, a file change time, and a device identifier. The stat data (t2) obtained via the system call interface to the OS kernel 105 may return substantially similar information as that obtained by the BPM program 106a to generate the stat data (t1) of the FP data (t1) 132.

The user space monitoring application 109 may obtain the mounting count data (t2) by accessing the data structure 111a to obtain the mounting count information for the device ID associated with the target application file 118 at time t2. The mounting count information retrieved at time t2 may be the mounting count information generated by the DMC program 106b (when a device is mounted or unmounted) and stored in the data structure 111a of the shared memory 110. In some embodiments, the mounting count data may be retrieved from the shared memory 110 by sending (e.g., via a bpf( ) system call) a mounting count data request to the shared memory 110.

The user space monitoring application 109 compares the FP data (t1) 132 and the FP data (t2) 142. If the fingerprinting data does not match, then the user space monitoring application 109 may determine that the content of the target application file 118 has been changed since the target application process 108 was launched. However, if the fingerprinting data (e.g., FP data (t1) 132 and FP data (t2) 142) matches, then the user space monitoring application 109 may determine that the content of the target application file 118 has not been changed since the target application process 108 was launched.

The user space monitoring application 109 may perform one or more remediation operations responsive to determining that the content of the target application file 118 has been changed since the target application process 108 was launched. For example, in some embodiments, the user space monitoring application 109 may terminate the target application process 108 if it is determined that the target application file 118 has been changed. However, the embodiments of the present disclosure are not limited to such an action. In some embodiments, the changing of the target application file 118 may not necessarily be due to malware. For example, in some embodiments, rather than terminating the target application process 108, a security monitoring of the target application process 108 may be increased. For example, communications produced by the target application process 108 and/or operating system operations may be scrutinized more frequently than if the target application file 118 had not been changed. In some embodiments, the file hash, the fingerprinting data (e.g., from time t1 and/or t2), and/or the determination as to whether the target application file 118 was changed after execution of the target application process 108 may be sent to the cloud service system 114 over the communication network 120.

The communication network 120 may be a public network (e.g., the internet), a private network (e.g., a local area network (LAN) or wide area network (WAN)), or a combination thereof. In one embodiment, communication network 120 may include a wired or a wireless infrastructure, which may be provided by one or more wireless communications systems, such as wireless fidelity (Wi-Fi) connectivity to the communication network 120 and/or a wireless carrier system that can be implemented using various data processing equipment, communication towers (e.g., cell towers), etc. The communication network 120 may carry communications (e.g., data, message, packets, frames, etc.) between any other the computing device.

The cloud service system 114 includes a plurality of host machines 115 and a scheduler device 116 that are each communicably connected to one another via the communication network 120 to form a cloud service system for providing services (e.g., application, networking) and/or computing resources (e.g., computing, storage) to the file fingerprinting computing device 102. The scheduler device 116 is configured to receive a request from the file fingerprinting computing device 102, determine which host machine 115 within the cloud service system 114 can process the request, and forward the request to the host machine 115 that is able to process the request. Each host machine 115 is configured to send a message to the scheduler device 116 to expose an application programming interface (API) to the services, resources (e.g., processor, storage, and/or cache memory, etc.), that are provided by the host machine 115. The scheduler device 116 determines which host machine 115 can process/perform the request based on the messages that the scheduler device 116 receives from each of the host machines 115 within the cloud service system 114. In some embodiments, the request \ may include a hash value and an indication that the hash value is validated.

A host machine 115, a scheduler device 116, and a file fingerprinting computing device 102 may each be any suitable type of computing device or machine that has a processing device, for example, a server computer (e.g., an application server, a catalog server, a communications server, a computing server, a database server, a file server, a game server, a mail server, a media server, a proxy server, a virtual server, a web server), a desktop computer, a laptop computer, a tablet computer, a mobile device, a smartphone, a set-top box, a graphics processing unit (GPU), etc. In some examples, a computing device may include a single machine or may include multiple interconnected machines (e.g., multiple servers configured in a cluster).

A host machine 115, a scheduler device 116, and a file fingerprinting computing device 102 may each be one or more virtual environments. In one embodiment, a virtual environment may be a virtual machine (VM) that may execute on a hypervisor which executes on top of an operating system (OS) for a computing device. The hypervisor may manage system sources (including access to hardware devices, such as processing devices, memories, storage devices). The hypervisor may also emulate the hardware (or other physical resources) which may be used by the VMs to execute software/applications. In another embodiment, a virtual environment may be a container that may execute on a container engine which executes on top of the OS for a computing device. For example, a container engine may allow different containers to share the OS of a computing device (e.g., the OS kernel, binaries, libraries, etc.).

The cloud service system 114 may use the same type or different types of virtual environments. For example, all the host machines 115 may be VMs. In another example, all the host machines 115 may be containers. In a further example, some of the host machines 115 may be VMs, other host machines 115 may be containers, and other host machines 115 may be computing devices (or groups of computing devices).

Although FIG. 1 shows only a select number of cloud service systems (e.g., cloud service system 114) and computing devices (e.g., host machines 115, file fingerprinting computing device 102); the system 100 may include any number of cloud service systems and computing devices that are interconnected in any arrangement to facilitate the exchange of data between the cloud service systems and computing devices.

Figures 4A, 4B:
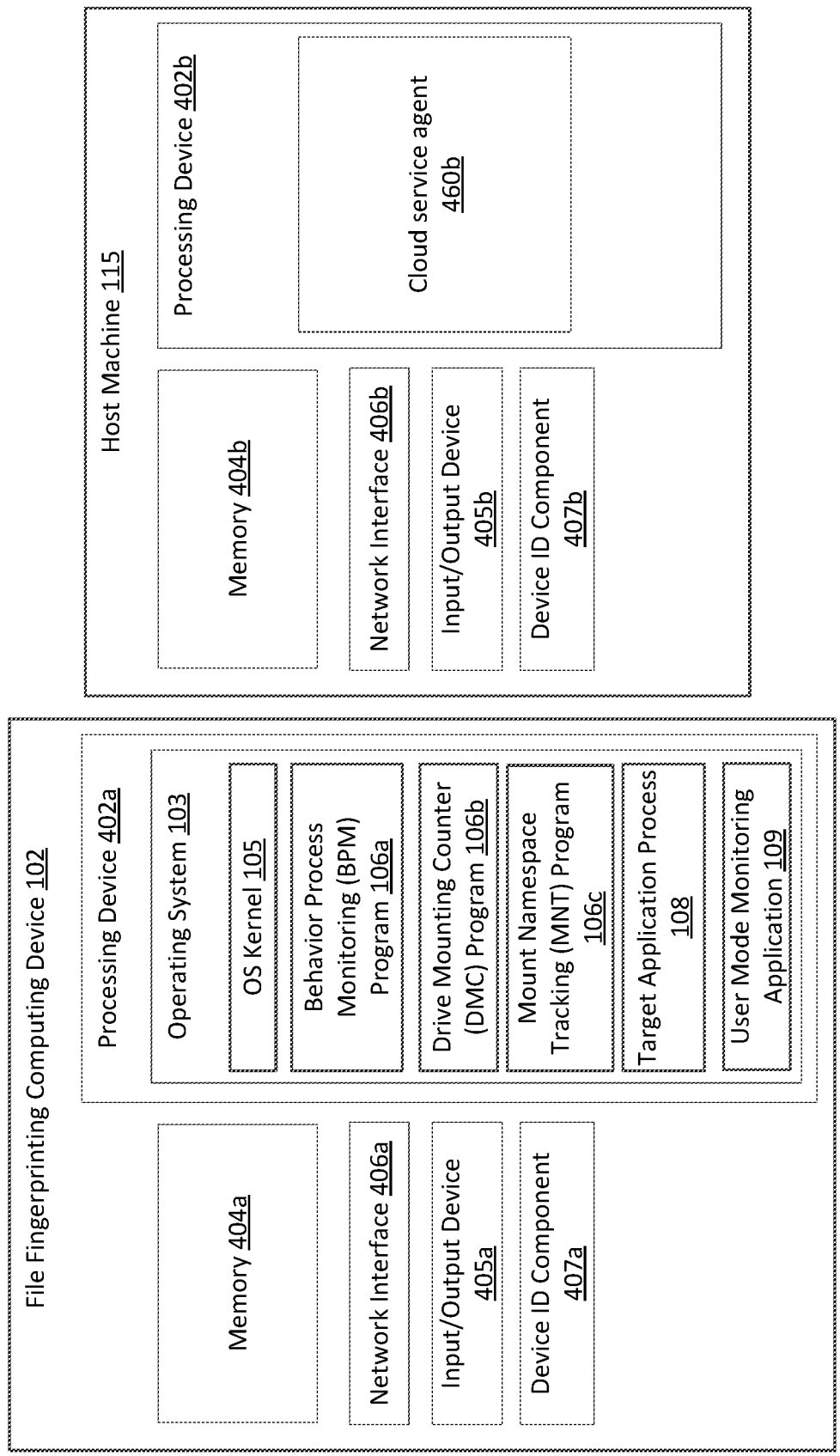
FIG. 4A is a block diagram depicting an example of the file fingerprinting computing device in FIG. 1, according to some embodiments of the present disclosure.
FIG. 4B is a block diagram depicting an example of the host machine of the environment in FIG. 1, according to some embodiments of the present disclosure.

FIG. 4A is a block diagram depicting an example of the file fingerprinting computing device 102 in FIG. 1, according to some embodiments of the present disclosure. While various devices, interfaces, and logic with particular functionality are shown, it should be understood that the file fingerprinting computing device 102 includes any number of devices and/or components, interfaces, and logic for facilitating the functions described herein. For example, the activities of multiple devices may be combined as a single device and implemented on a same processing device (e.g., processing device 402a), as additional devices and/or components with additional functionality are included.

The file fingerprinting computing device 102 includes a processing device 402a (e.g., general purpose processor, a PLD, etc.), which may be composed of one or more processors, and a memory 404a (e.g., synchronous dynamic random-access memory (DRAM), read-only memory (ROM)), which may communicate with each other via a bus (not shown).

The processing device 402a may be provided by one or more general-purpose processing devices such as a microprocessor, central processing unit, or the like. In some embodiments, processing device 402a may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 402a may include one or more special-purpose processing devices such as an application specific integrated circuit (ASIC), a field programmable gate array (FPGA), a digital signal processor (DSP), network processor, or the like. The processing device 402a may be configured to execute the operations described herein, in accordance with one or more aspects of the present disclosure, for performing the operations and steps discussed herein.

The memory 404a (e.g., Random Access Memory (RAM), Read-Only Memory (ROM), Non-volatile RAM (NVRAM), Flash Memory, hard disk storage, optical media, etc.) of processing device 402a stores data and/or computer instructions/code for facilitating at least some of the various processes described herein. The memory 404a includes tangible, non-transient volatile memory, or non-volatile memory. The memory 404a stores programming logic (e.g., instructions/code) that, when executed by the processing device 402a, controls the operations of the file fingerprinting computing device 102. In some embodiments, the processing device 402a and the memory 404a form various processing devices and/or circuits described with respect to the file fingerprinting computing device 102. The instructions include code from any suitable computer programming language such as, but not limited to, C, C++, C#, Java, JavaScript, VBScript, Perl, HTML, XML, Python, TCL, and Basic.

The processing device 402a may be configured to execute an operating system 103. The operating system 103 includes an OS kernel 105 (e.g., Linux, Zircon, Windows NT kernel, etc.) that is a computer program that has complete control over the operating system 103. The OS kernel 105 is the portion of the operating system code that stays resident in memory and facilitates interactions between hardware and software components on the file fingerprinting computing device 102. The OS kernel 105 is one of the first programs loaded on startup (e.g., after the bootloader). The OS kernel 105 handles the rest of startup as well as memory, peripherals, and input/output (I/O) requests from software, translating them into data-processing instructions for the processing device 402a. The OS kernel 105 may be any type of kernel including, for example, a monolithic kernel, a microkernel, a hybrid kernel, or an exokernel.

The processing device 402a may be configured to execute an operating system 103 that segregates its resources (e.g., memory 404a, processing device 402a, etc.) of the file fingerprinting computing device 102 into a kernel space 104 and a user space 107. The processing device 402a executes an OS kernel 105, a BPM program 106a, a DMC program 106b, and an MNT program 106c in the kernel space 104 of the operating system 103. In some embodiments, the BPM program 106a, the DMC program 106b, and the MNT program 106c each execute within the kernel space 104 of the operating system 103. The processing device 402a executes a target application process 108 and user space monitoring application 109 in the user space 107 of the operating system 103.

The BPM program 106a may be configured to monitor the target application process 108 as it executes in the user space 107 of the operating system 103 to detect an execution of the target application process 108. The BPM program 106a may be configured to acquire a set of fingerprinting data associated with the target application process 108 and/or the target application file 118 from which the target application process 108 was loaded responsive to detecting the real-time behavior of the target application process 108. The BPM program 106a may be configured to share the fingerprinting data 132 with the user space monitoring application 109 that is executing in the user space 107 of the operating system 103 via a notification channel 122, which may utilize portions of memory 404a.

The set of fingerprinting data 132 may include at least one of a file change time indicating when file contents of the target application file 118 are changed, a device identifier that uniquely identifies one or more storage devices on which the target application file 118 is stored that are mounted at a particular time to be available to one or more applications, a file inode number that uniquely identifies the target application file 118 as stored on a particular storage device of the one or more storage devices, a device mount count indicating a number of times the particular device identifier has been mounted (or unmounted, in some embodiments) to be available to the one or more applications, a file path of the target application file 118, one or more PIDs of the target process application 108 (including those of the ancestors (e.g., parent, grandparent) and descendants (e.g., child)).

The user space monitoring application 109 be configured to generate a hash value of the target application file 118 and determine a validity of the hash value based on the fingerprinting data 132.

In some embodiments, the resource limitations of the kernel space 104 prevent applications and/or programs (e.g., BPM program 106a, DMC program 106b, and MNT program 106c) that are executing in the kernel space 104 from being able to calculate a hash value of the target application file 118.

In some embodiments, the set of fingerprinting data 132 that are associated with the target application file 118 is generated at a first duration (e.g., time t1). The user space monitoring application 109 may be configured to generate the hash value of the target application file 118 at a second duration (e.g., time t2) after the first duration.

The user space monitoring application 109 may be configured to validate the hash value of the target application file 118 based on the fingerprinting data 132 by acquiring a second set of fingerprinting data 142 associated with the target application file 118, and comparing the set of fingerprinting data (e.g., FP data (t1) 132) and the second set of fingerprinting data (e.g., FP data (t2) 142).

It is possible for two devices mounted at different times to have the same device identifier because the device identifier is not globally unique. Therefore, the file fingerprinting computing device 102 may use both the device mount counter and the device identifier to identify when a device identifier may have been changed. For example, the file fingerprinting computing device 102 may combine (e.g., concatenate) the device mount counter and the device identifier into a single alphanumeric identifier to represent a device.

The OS kernel 105 may be configured to generate information including at least one of the file inode number, the file change time, or the device identifier. The OS kernel 105 directly (e.g., without using the shared memory 110) provides the information to one or more programs (e.g., BPM program 106a, DMC program 106b, and MNT program 106c) that are executing in the kernel space 104.

The BPM program 106a may be configured to generate the set of fingerprinting data 132 associated with the target application process 108 based on the information from the OS kernel 105.

The DMC program 106b may be configured to detect when a particular storage device of the one or more storage devices is mounted to be available to the one or more applications (e.g., target application process 108). The DMC program 106b may be configured to calculate the device mount count indicating the number of times the device identifier is mounted (or unmounted, in some embodiments) to a particular storage device of the one or more storage devices to be available to the one or more applications.

The OS kernel 105 may be configured to receive a request to execute the target application process 108 in the user space 107 of the operating system 103. The OS kernel 105 may be configured to execute one or more programs (e.g., BPM program 106a, DMC program 106b, and MNT program 106c) in the kernel space 104 of the operating system 103 responsive to receiving the request to execute the target application process 108 in the user space 107 of the operating system 103.

The MNT program 106c may be configured to monitor a first mount namespace associated with the operating system 103 to identify one or more processes of the first mount namespace. Each of the one or more processes may have access to the target application process 108 executing in the user space 107 of the operating system 103 via one or more filesystem views of the first mount namespace. The MNT program 106c may be configured to share namespace data associated with the one or more processes of the first mount namespace with the user space monitoring application 109 executing in the user space 107 of the operating system 103 via the data structure 111b of the shared memory 110. For example, the MNT program 106c stores the namespace data in the data structure 111b of the shared memory 110, which allows the user space monitoring application 109 to acquire the namespace data by sending (e.g., via a bpf( ) system call) a namespace data request to the shared memory 110. The namespace data that is generated and shared by the MNT program 106c allows the user space monitoring application 109 to switch from a second filesystem view of a second mount namespace to a first filesystem view of the first mount namespace to access the target application file 118.

The MNT program 106c may be configured to monitor the first mount namespace to identify the one or more processes of the first mount namespace by identifying an association between a plurality of process identifiers (PIDs) and the first mount namespace.

In some embodiments, the namespace data associated with the one or more processes of the first mount namespace includes at least one of one or more process identifiers, a mount namespace identifier, or one or more file paths of the one or more processes.

The user space monitoring application 109 may be configured to generate a hash value of the target application file 118 responsive to accessing the target application file 118 using the first filesystem view of the first mount namespace. The user space monitoring application 109 may determine whether a hash value of the target application file 118 is valid based on the set of fingerprinting data 132.

The MNT program 106c may be configured to monitor the first mount namespace to identify the one or more processes of the first mount namespace by determining that a first process of the first mount namespace terminated or switched to a second mount namespace, generating an updated namespace data associated with the one or more processes of the first mount namespace that excludes a first identifier of the first process, and sharing the updated namespace data with the user space monitoring application 109 via the data structure 111b of the shared memory 110.

The first filesystem view of the first mount namespace may be associated with a first process of the one or more processes of the first mount namespace. The user space monitoring application 109 may be configured to determine that the first process of the first mount namespace terminated or switched to a second mount namespace. The user space monitoring application 109 may be configured to identify, using the namespace data, a second process of the first mount namespace that is actively running (e.g., not terminated). The user space monitoring application 109 may be configured to switch, using the process metadata, to the first filesystem view of the first mount namespace that is associated with the second process to access the target application file 118. For example, the user space monitoring application 109 may send a request to the OS kernel 105 to switch the user space monitoring application 109 to the first filesystem view of the first mount namespace that is associated with the second process to access the target application file 118. In response, the OS kernel 105 grants the request by switching the user space monitoring application 109 to a different filesystem view.

The user space monitoring application 109 may be configured to determine that an additional process of the one or more processes joined the first mount namespace.

The MNT program 106c may be configured to generate an updated namespace data associated with the one or more processes of the first mount namespace that adds an additional identifier of the additional processes and shares the updated namespace data with the user space monitoring application 109 executing in the user space 107 of the operating system 103 via the data structure 111b of the shared memory 110. The MNT program 106c may be configured to identify one or more mount namespaces associated with a filesystem of the operating system 103 and assign a unique identifier to each of the one or more mount namespaces. The MNT program 106c may be configured to track a single process of the operating system to generate the namespace data.

The namespace data associated with one or more processes (e.g., target application process 108) may include, for example, a mount namespace identifier (e.g., mount namespace B) associated with a process identifier and/or process (including those of the ancestors (e.g., parent, grandparent) and descendants (e.g., child) of the process), a file path of the target application file 118, and/or any other information that allows an application to use an API of the operating system 103 to switch a filesystem view and access a file.

The file fingerprinting computing device 102 includes a network interface 406a configured to establish a communication session with a computing device for sending and receiving data over the communication network 120 to the computing device. Accordingly, the network interface 406A may include a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the file fingerprinting computing device 102 includes a plurality of network interfaces 406a of different types, allowing for connections to a variety of networks, such as local area networks (public or private) or wide area networks including the Internet, via different sub-networks.

The file fingerprinting computing device 102 includes an input/output device 405a configured to receive user input from and provide information to a user. In this regard, the input/output device 405a is structured to exchange data, communications, instructions, etc. with an input/output component of the file fingerprinting computing device 102. Accordingly, input/output device 405a may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the file fingerprinting computing device 102, such as a built-in display, touch screen, microphone, etc., or external to the housing of the file fingerprinting computing device 102, such as a monitor connected to the file fingerprinting computing device 102, a speaker connected to the file fingerprinting computing device 102, etc., according to various embodiments. In some embodiments, the file fingerprinting computing device 102 includes communication circuitry for facilitating the exchange of data, values, messages, and the like between the input/output device 405a and the components of the file fingerprinting computing device 102. In some embodiments, the input/output device 405a includes machine-readable media for facilitating the exchange of information between the input/output device 405a and the components of the file fingerprinting computing device 102. In still another embodiment, the input/output device 405a includes any combination of hardware components (e.g., a touchscreen), communication circuitry, and machine-readable media.

The file fingerprinting computing device 102 includes a device identification component 407a (shown in FIG. 4A as device ID component 407a) configured to generate and/or manage a device identifier associated with the file fingerprinting computing device 102. The device identifier may include any type and form of identification used to distinguish the file fingerprinting computing device 102 from other computing devices. In some embodiments, to preserve privacy, the device identifier may be cryptographically generated, encrypted, or otherwise obfuscated by any device and/or component of the file fingerprinting computing device 102. In some embodiments, the file fingerprinting computing device 102 may include the device identifier in any communication (e.g., remedial action messages, etc.) that the file fingerprinting computing device 102 sends to a computing device.

The file fingerprinting computing device 102 includes a bus (not shown), such as an address/data bus or other communication mechanism for communicating information, which interconnects the devices and/or components of the file fingerprinting computing device 102, such as processing device 402a, network interface 406a, input/output device 405a, and device ID component 407a.

In some embodiments, some or all of the devices and/or components of file fingerprinting computing device 102 may be implemented with the processing device 402a. For example, the file fingerprinting computing device 102 may be implemented as a software application stored within the memory 404a and executed by the processing device 402a. Accordingly, such embodiment can be implemented with minimal or no additional hardware costs. In some embodiments, any of these above-recited devices and/or components rely on dedicated hardware specifically configured for performing operations of the devices and/or components.

FIG. 4B is a block diagram depicting an example of the host machine 115 of the system 100 in FIG. 1, according to some embodiments of the present disclosure. While various devices, interfaces, and logic with particular functionality are shown, it should be understood that the host machine 115 includes any number of devices and/or components, interfaces, and logic for facilitating the functions described herein. For example, the activities of multiple devices may be combined as a single device and implemented on a same processing device (e.g., processing device 402b), as additional devices and/or components with additional functionality are included.

The host machine 115 includes a processing device 402b (e.g., general purpose processor, a PLD, etc.), which may be composed of one or more processors, and a memory 404b (e.g., synchronous dynamic random-access memory (DRAM), read-only memory (ROM)), which may communicate with each other via a bus (not shown). The processing device 402b includes identical or nearly identical functionality as processing device 402a in FIG. 4a, but with respect to devices and/or components of the host machine 115 instead of devices and/or components of the file fingerprinting computing device 102.

The memory 404b of processing device 402b stores data and/or computer instructions/code for facilitating at least some of the various processes described herein. The memory 404b includes identical or nearly identical functionality as memory 404a in FIG. 4A, but with respect to devices and/or components of the host machine 115 instead of devices and/or components of the file fingerprinting computing device 102.

The processing device 402b may be configured to execute a cloud service agent 460b that is configured to process/perform a request. The cloud service agent 460b may be configured to receive a message from the file fingerprinting computing device 102 that indicates that an attacker (e.g., computer) has tampered with the target application process 108. For example, the message (e.g., target application execution message) that includes a hash value and an indication that the hash value is either validated or not validated. If the message indicates that the hash value is not validated, then the cloud service agent 460 may implement remedial measures by, for example, sending a message to the file fingerprinting computing device 102 to cause the File fingerprinting computing device 102 to terminate the one or more processes (e.g., including child processes) that are associated with the target application process 108.

The host machine 115 includes a network interface 406b configured to establish a communication session with a computing device for sending and receiving data over a network to the computing device. Accordingly, the network interface 406b includes identical or nearly identical functionality as network interface 406a in FIG. 4A, but with respect to devices and/or components of the host machine 115 instead of devices and/or components of the file fingerprinting computing device 102.

The host machine 115 includes an input/output device 405b configured to receive user input from and provide information to a user. In this regard, the input/output device 405b is structured to exchange data, communications, instructions, etc. with an input/output component of the host machine 115. The input/output device 405b includes identical or nearly identical functionality as input/output device 405a in FIG. 4A, but with respect to devices and/or components of the host machine 115 instead of devices and/or components of the file fingerprinting computing device 102.

The host machine 115 includes a device identification component 407b (shown in FIG. 4B as device ID component 407b) configured to generate and/or manage a device identifier associated with the host machine 115. The device ID component 407b includes identical or nearly identical functionality as device ID component 407a in FIG. 4A, but with respect to devices and/or components of the host machine 115 instead of devices and/or components of the file fingerprinting computing device 102.

The host machine 115 includes a bus (not shown), such as an address/data bus or other communication mechanism for communicating information, which interconnects the devices and/or components of the host machine 115, such as processing device 402b, network interface 406b, input/output device 405b, and device ID component 407b.

In some embodiments, some or all of the devices and/or components of the host machine 115 may be implemented with the processing device 402b. For example, the host machine 115 may be implemented as a software application stored within the memory 404b and executed by the processing device 402b. Accordingly, such embodiment can be implemented with minimal or no additional hardware costs. In some embodiments, any of these above-recited devices and/or components rely on dedicated hardware specifically configured for performing operations of the devices and/or components.

FIG. 5 is a flow diagram depicting a method of generating a file hash using fingerprinting data, according to some embodiments of the present disclosure. Method 500 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, method 500 may be performed by a file fingerprinting computing device 102, such as a file fingerprinting computing device 102 in FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

As shown in FIG. 5, the method 500 includes the block 502 of acquiring, using one or more programs executing in a kernel space of an operating system, fingerprinting data associated with a target application process in a user space of the operating system responsive to detecting an execution of the target application process. In some embodiments, the one or more programs may be similar to the BPM program 106a, the DMC program 106b, and/or the MNT program 106c, as described herein with respect to FIGS. 1 to 4B. The fingerprinting data may be similar to FP data 132, as described herein with respect to FIGS. 1 to 4B. The target application process may be similar to target application process 108, as described herein with respect to FIGS. 1 to 4B. In some embodiments, the one or more programs may execute within an extended Berkeley Packet Filter (eBPF) infrastructure.

The method 500 includes the block 504 of sharing, by a processing device using the one or more programs, the fingerprinting data with a user space monitoring application executing in the user space of the operating system. In some embodiments, the user space monitoring application may be similar to the user space monitoring application 109, as described herein with respect to FIGS. 1 to 4B. In some embodiments, sharing, by the processing device using the one or more programs, the fingerprinting data with the user space monitoring application comprises transmitting a notification message to the user space monitoring application utilizing a notification channel. In some embodiments, the notification channel and notification message may be similar to notification channel 122 and notification message 124, respectively, as described herein with respect to FIGS. 1 to 4B.

The method 500 includes the block 506 of generating a hash value of a target application file associated with the target application process. The target application file may be similar to target application file 118, as described herein with respect to FIGS. 1 to 4B.

In some embodiments, the fingerprinting data comprises at least one of: a file change time indicating when file contents of the target application file are changed, a device identifier indicating a storage location of the target application file, a file inode number of the target application file, or a device mount count indicating a number of times a storage device with the device identifier was changed.

The method 500 includes the block 508 of determining, using the user space monitoring application, a validity of the hash value based on the fingerprinting data. In some embodiments, fingerprinting data is first fingerprinting data and acquiring the first fingerprinting data associated with the target application process is performed at a first time. In some embodiments, the method 500 may further include acquiring, by the user space monitoring application, second fingerprinting data associated with the target application process at a second time, later than the first time. The first fingerprinting data from the first time may be similar to fingerprinting data (t1) 132 and the second fingerprinting data from the second time may be similar to fingerprinting data (t2) 142, as described herein with respect to FIGS. 1 to 4B. In some embodiments, determining the validity of the hash value is based on the first fingerprinting data and the second fingerprinting data. In some embodiments, determining the validity of the hash value is based on a comparison of elements of the first fingerprinting data acquired at the first time with corresponding elements of the second fingerprinting data acquired at the second time. For example, a device mount count of the first fingerprinting data may be compared to a device mount count of the second fingerprinting data.

In some embodiments, the method 500 may further include executing a second program of the one or more programs in the kernel space of the operating system to maintain the device mount count indicating the number of times the storage device with the device identifier was changed. In some embodiments, the second program may be similar to the DMC program 106b, as described herein with respect to FIGS. 1 to 4B.

FIG. 6 is a flow diagram depicting a method 600 of generating a file hash using mount namespace data, according to some embodiments of the present disclosure. Method 600 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, method 600 may be performed by a file fingerprinting computing device 102, such as a file fingerprinting computing device 102 in FIG. 1.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

As shown in FIG. 6, the method 600 includes the block 602 of identifying, by a user space monitoring application executing in a user space of an operating system, a target application file associated with a target application process executing in the user space of the operating system, wherein the target application process is associated with a first mount namespace. In some embodiments, the user space monitoring application may be similar to the user space monitoring application 109, as described herein with respect to FIGS. 1 to 4B. In some embodiments, the target application process and the target application file may be similar to the target application process 108 and the target application file 118, respectively, as described herein with respect to FIGS. 1 to 4B. The first mount namespace may be similar to the mount namespaces 303a, 303b, as described herein with respect to FIG. 3. In some embodiments, the target application process is associated with a second mount namespace that is different from the first mount namespace.

The method 600 includes the block 604 of accessing, by the user space monitoring application, a mapping between the first mount namespace and one or more processes executing in the user space of the operating system. The mapping may be similar to the mount namespace mapping 350, as described herein with respect to FIG. 3. In some embodiments, the mapping between the first mount namespace and the one or more processes executing in the user space of the operating system comprises a mapping between an identifier of the first mount namespace and a respective process identifier (PID) of the one or more processes. In some embodiments, accessing, by the user space monitoring application, the mapping comprises retrieving, by the user space monitoring application, the mapping from a shared memory that is shared between the user space of the operating system and a kernel space of the operating system. In some embodiments the shared memory may be similar to the shared memory 110 and/or the data structure 111b, as described herein with respect to FIGS. 1 to 4B.

The method 600 includes the block 606 of switching, by a processing device, the user space monitoring application to the first mount namespace based on the mapping. In some embodiments, accessing, by the user space monitoring application, the mapping between the first mount namespace and one or more processes executing in the user space of the operating system comprises accessing the mapping to retrieve a process identifier (PID) associated with the first mount namespace. In some embodiments, switching, by the processing device, the user space monitoring application to the first mount namespace based on the mapping comprises providing the PID as input to an application programming interface (API) of the operating system. In some embodiments, the PID provided as input to the API is different from a PID of the target application process.

The method 600 includes the block 608 of accessing, by the user space monitoring application, the target application file in the first mount namespace to generate a file hash of the target application file.

In some embodiments, the method 600 may further include monitoring, using one or more programs executing in a kernel space of the operating system, the first mount namespace to identify an update to a first process of the operating system that associates the first process with the first mount namespace; and updating the mapping to associate the first process with the first mount namespace. In some embodiments the one or more programs may be similar to the MNT program 106c, as described herein with respect to FIGS. 1 to 4B. In some embodiments, the one or more programs may execute within an extended Berkeley Packet Filter (eBPF) infrastructure.

In some embodiments, monitoring, using the one or more programs executing in the kernel space of the operating system, the first mount namespace to identify the update to the first process of the operating system that associates the first process with the first mount namespace determining, using the one or more programs, that the first process switched from a second mount namespace to the first mount namespace and updating the mapping to add an entry that associates the first process with the first mount namespace and to remove an entry that associates the first process with the second mount namespace.

Figure 7:
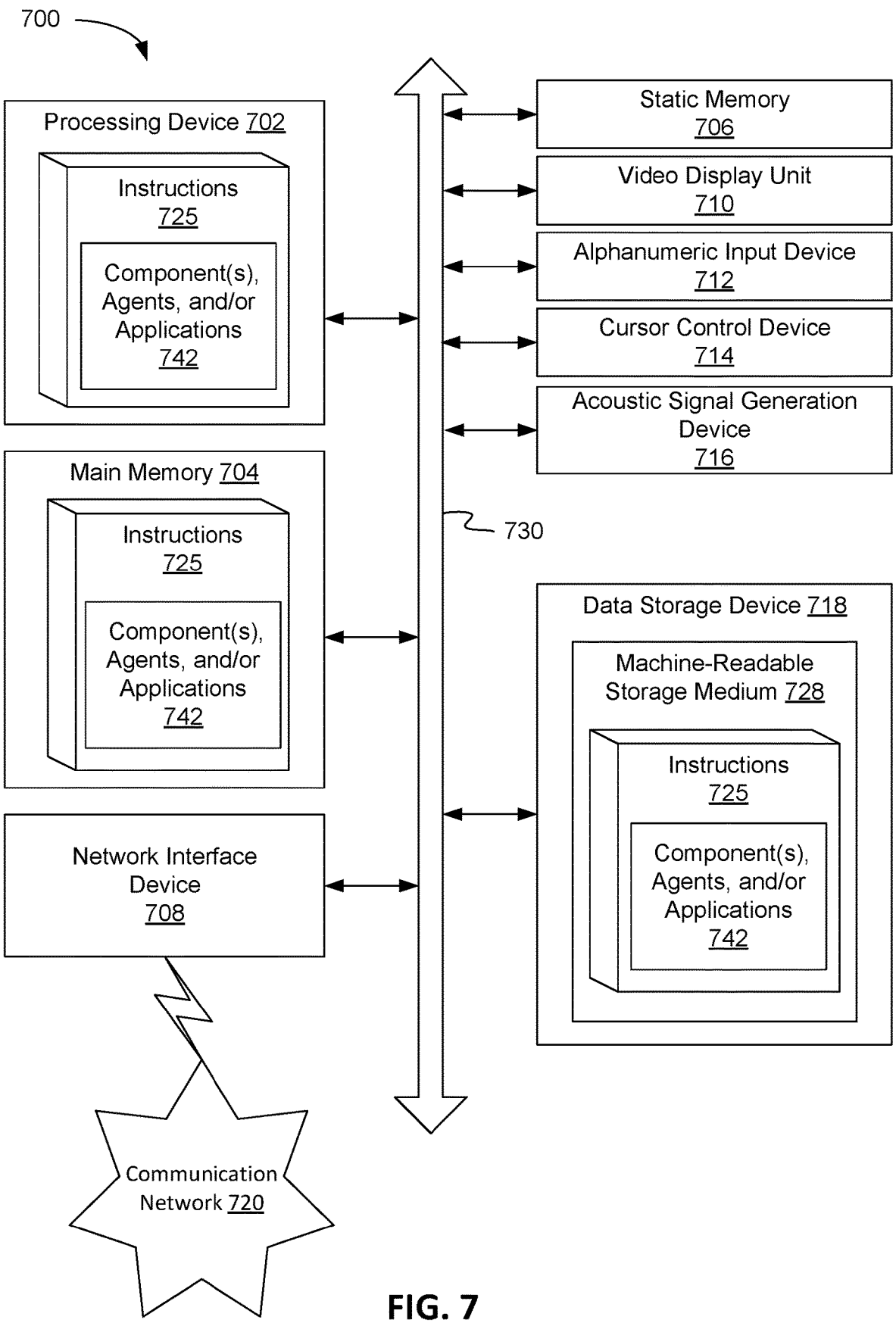
FIG. 7 is a block diagram of an example computing device that may perform one or more of the operations described herein, in accordance with some embodiments of the present disclosure.

FIG. 7 is a block diagram of an example computing device 700 that may perform one or more of the operations described herein, in accordance with some embodiments of the present disclosure. Computing device 700 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 700 may include a processing device (e.g., a general-purpose processor, a PLD, etc.) 702, a main memory 704 (e.g., synchronous dynamic random-access memory (DRAM), read-only memory (ROM)), a static memory 706 (e.g., flash memory and a data storage device 718), which may communicate with each other via a bus 730.

Processing device 702 may be provided by one or more general-purpose processing devices such as a microprocessor, central processing unit, or the like. In an illustrative example, processing device 702 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 may also include one or more special-purpose processing devices such as an application specific integrated circuit (ASIC), a field programmable gate array (FPGA), a digital signal processor (DSP), network processor, or the like. The processing device 702 may be configured to execute the operations described herein, in accordance with one or more aspects of the present disclosure, for performing the operations and steps discussed herein.

Computing device 700 may further include a network interface device 708 which may communicate with a communication network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Data storage device 718 may include a computer-readable storage medium 728 on which may be stored one or more sets of instructions 725 that may include instructions for one or more components/programs/applications 742 (e.g., operating system 103, OS kernel 105, BPM program 106a, DMC program 106b, and MNT program 106c, target application process 108, user space monitoring application 109 in FIG. 4A, etc.) for carrying out the operations described herein, in accordance with one or more aspects of the present disclosure. Instructions 725 may also reside, completely or at least partially, within main memory 704 and/or within processing device 702 during execution thereof by computing device 700, main memory 704 and processing device 702 also constituting computer-readable media. The instructions 725 may further be transmitted or received over a communication network 720 via network interface device 708.

While computer-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that cause the machine to perform the methods described herein. The term "computer-readable storage medium" shall accordingly be taken to include, but not be limited to, solid-state memories, optical media, and magnetic media.

Unless specifically stated otherwise, terms such as "acquiring," "sharing," "generating," "determining," "executing," "transmitting," "identifying," "accessing," "switching," "monitoring," "updating," "retrieving," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. As used herein, the term "and/or" includes any and all combination of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present embodiments to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present embodiments are not to be limited to the details given herein, but may be modified within the scope and equivalents of the appended claims.

What is claimed is:

1. A method comprising:
    identifying, by a user space monitoring application executing in a user space of an operating system, a target application file associated with a target application process executing in the user space of the operating system, wherein the target application process is associated with a first mount namespace in a kernel space of the operating system that is currently inaccessible by the user space monitoring application;
    determining that a first process of the operating system switched from a second mount namespace to the first mount namespace;
    updating a mapping to add an entry that associates the first process with the first mount namespace and remove an entry associating the first process with the second mount namespace; and
    in response to the first mount namespace being inaccessible by the user space monitoring application:
        accessing, by the user space monitoring application, the updated mapping between the first mount namespace and the first process executing in the user space of the operating system, wherein the accessing further comprises retrieving the updated mapping from a shared memory that is shared between the user space of the operating system and the kernel space of the operating system;
        switching, by a processing device, the user space monitoring application to the first mount namespace based on a process identifier (PID) in the updated mapping that corresponds to the first process; and
        accessing, by the user space monitoring application, the target application file in the first mount namespace; and
    generating a file hash of contents of the target application file.

2. The method of claim 1, further comprising:
    monitoring the first mount namespace using one or more programs executing in the kernel space of the operating system.

3. The method of claim 1, wherein the updated mapping between the first mount namespace and the one or more processes executing in the user space of the operating system comprises a mapping between an identifier of the first mount namespace and the PID.

4. The method of claim 1, wherein the target application process is associated with the second mount namespace that is different from the first mount namespace.

5. The method of claim 1, wherein accessing, by the user space monitoring application, the updated mapping between the first mount namespace and one or more processes executing in the user space of the operating system comprises accessing the mapping to retrieve the PID, and
    wherein switching, by the processing device, the user space monitoring application to the first mount namespace based on the mapping comprises providing the PID as input to an application programming interface (API) of the operating system.

6. The method of claim 5, wherein the PID provided as input to the API is different from a PID of the target application process.

7. A system comprising:
a memory; and
a processing device, operatively coupled to the memory, to:
identify, by a user space monitoring application executing in a user space of an operating system, a target application file associated with a target application process executing in the user space of the operating system, wherein the target application process is associated with a first mount namespace in a kernel space of the operating system that is currently inaccessible by the user space monitoring application;
determine that a first process of the operating system switched from a second mount namespace to the first mount namespace;
update a mapping to add an entry that associates the first process with the first mount namespace and remove an entry associating the first process with the second mount namespace; and
in response to the first mount namespace being inaccessible by the user space monitoring application:
access, by the user space monitoring application, the updated mapping between the first mount namespace and the first process executing in the user space of the operating system, wherein the access is further to retrieve the updated mapping from a shared memory that is shared between the user space of the operating system and the kernel space of the operating system;
switch, the user space monitoring application to the first mount namespace based on a process identifier (PID) in the updated mapping that corresponds to the first process; and
access, by the user space monitoring application, the target application file in the first mount namespace; and
generate a file hash of contents of the target application file.

8. The system of claim 7, wherein the processing device is further to:
monitor the first mount namespace using one or more programs executing in the kernel space of the operating system.

9. The system of claim 7, wherein the updated mapping between the first mount namespace and the one or more processes executing in the user space of the operating system comprises a mapping between an identifier of the first mount namespace and the PID.

10. The system of claim 7, wherein, to access, by the user space monitoring application, the updated mapping between the first mount namespace and one or more processes executing in the user space of the operating system, the processing device is to access the mapping to retrieve the PID, and
wherein, to switch the user space monitoring application to the first mount namespace based on the mapping, the processing device is to provide the PID as input to an application programming interface (API) of the operating system.

11. A non-transitory computer-readable storage medium including instructions that, when executed by a processing device, cause the processing device to:
identify, by a user space monitoring application executing in a user space of an operating system, a target application file associated with a target application process executing in the user space of the operating system, wherein the target application process is associated with a first mount namespace in a kernel space of the operating system that is currently inaccessible by the user space monitoring application;
determine that a first process of the operating system switched from a second mount namespace to the first mount namespace;
update a mapping to add an entry that associates the first process with the first mount namespace and remove an entry associating the first process with the second mount namespace; and
in response to the first mount namespace being inaccessible by the user space monitoring application:
access, by the user space monitoring application, the updated mapping between the first mount namespace and the first process executing in the user space of the operating system, wherein the access is further to retrieve the updated mapping from a shared memory that is shared between the user space of the operating system and the kernel space of the operating system;
switch, by the processing device, the user space monitoring application to the first mount namespace based on a process identifier (PID) in the mapping that corresponds to the process; and
access, by the user space monitoring application, the target application file in the first mount namespace; and
generate a file hash of contents of the target application file.

12. The non-transitory computer-readable storage medium of claim 11, wherein the processing device is further to:
monitor the first mount namespace using one or more programs executing in the kernel space of the operating system.

13. The non-transitory computer-readable storage medium of claim 11, wherein the updated mapping between the first mount namespace and the one or more processes executing in the user space of the operating system comprises a mapping between an identifier of the first mount namespace and the PID.

14. The non-transitory computer-readable storage medium of claim 11, wherein, to access, by the user space monitoring application, the updated mapping between the first mount namespace and one or more processes executing in the user space of the operating system, the processing device is to access the mapping to retrieve the PID, and
wherein, to switch the user space monitoring application to the first mount namespace based on the mapping, the processing device is to provide the PID as input to an application programming interface (API) of the operating system.

* * * * *